(12) United States Patent
Setomoto et al.

(10) Patent No.: US 8,999,435 B2
(45) Date of Patent: Apr. 7, 2015

(54) PROCESS OF PRODUCING GRATING FOR X-RAY IMAGE PICKUP APPARATUS

(75) Inventors: Yutaka Setomoto, Tokyo (JP); Atsunori Terasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 962 days.

(21) Appl. No.: 12/859,076

(22) Filed: Aug. 18, 2010

(65) Prior Publication Data

US 2011/0052800 A1 Mar. 3, 2011

(30) Foreign Application Priority Data

Aug. 31, 2009 (JP) ................ 2009-200237

(51) Int. Cl.
| | |
|---|---|
| *B05B 5/00* | (2006.01) |
| *B05D 5/06* | (2006.01) |
| *C03C 17/00* | (2006.01) |
| *G02B 1/10* | (2006.01) |
| *B29D 11/00* | (2006.01) |
| *G21K 1/02* | (2006.01) |

(52) U.S. Cl.
CPC .......... *B29D 11/00769* (2013.01); *G21K 1/025* (2013.01); *G21K 2207/005* (2013.01)

(58) Field of Classification Search
CPC ............ B29D 11/00769; G21K 1/025; G21K 2207/005

USPC .................................................. 427/160, 169
See application file for complete search history.

(56) References Cited

U.S. PATENT DOCUMENTS

| | | | | |
|---|---|---|---|---|
| 2007/0053635 | A1* | 3/2007 | Iazikov et al. | 385/37 |
| 2007/0183579 | A1* | 8/2007 | Baumann et al. | 378/145 |
| 2007/0183583 | A1* | 8/2007 | Baumann et al. | 378/145 |

FOREIGN PATENT DOCUMENTS

| | | | |
|---|---|---|---|
| JP | 2007-206075 A | | 8/2007 |
| JP | 2009037023 A | * | 2/2009 |

OTHER PUBLICATIONS

Machine translation, JP 2009037023 A.*

* cited by examiner

*Primary Examiner* — David Turocy
*Assistant Examiner* — Michael G Miller
(74) *Attorney, Agent, or Firm* — Canon USA Inc. IP Division

(57) ABSTRACT

A process of producing a grating to be used in an X-ray image pickup apparatus includes the steps of preparing a grating having a plurality of protrusions periodically arranged, curving the grating in the direction in which the plurality of protrusions is arranged, and filling spaces between the protrusions with a metal in a state that the grating is curved.

17 Claims, 6 Drawing Sheets

US 8,999,435 B2

PROCESS OF PRODUCING GRATING FOR X-RAY IMAGE PICKUP APPARATUS

BACKGROUND OF THE INVENTION

1. Field of the Invention

The present invention relates to a process of producing a grating to be used in an X-ray image pickup apparatus.

2. Description of the Related Art

Recently, an image pickup method utilizing Talbot interference (Talbot interferometry) has been investigated as an imaging method utilizing X-ray phase contrast (X-ray phase imaging). In the image pickup apparatus utilizing Talbot interference, X-ray radiation emitted from a spatially-coherent X-ray source passes, in sequence, through a subject, a pair of diffraction gratings arranged in accordance to principles of Talbot interferometry, and reaches a detector to form an image. Specifically, X-ray radiation after passing through a subject is made incident on a diffraction grating for periodically modulating the phase of the X-ray (hereinafter, referred to as phase grating), and a diffraction grating made of a material absorbing the X-ray and having a sufficient thickness (hereinafter, referred to as absorption grating), so that X-ray phase imaging is performed. Conventional X-ray imaging, whether measured with film or digital detectors, relies in the absorption of X-ray radiation, e.g., in tumorous versus healthy tissue. Accordingly, there are limitations in conventional absorption radiography due to tradeoffs between contrast and dose. In contrast, X-ray phase imaging is believed to be advantageous due to an excellent sensitivity to soft structures; and great spatial resolution limited only by the pitch of the gratings.

In this specification, the term "spatially-coherent X-ray source" refers to an X-ray source that can generate X-ray radiation having coherent wavefronts in the direction of the X-ray propagation. In general, an X-ray source produces fan-shaped or cone-shaped X-ray beams. The thus generated X-ray radiation enters a grating at a certain radiation angle. Therefore, the direction of the incident X-ray beams is not parallel to the direction of grooves formed in the grating, and thereby a shadowed area is formed. As a result, a clear image cannot be easily captured.

FIG. 3 illustrates a known method of using a grating that is curved at the same curvature of the coherent wavefronts of fan-shaped or cone-shaped X-ray beams. When the curved grating is used, the direction of incident X-ray radiation is parallel to the direction of grooves formed in the grating, and thereby a clear image can be obtained.

FIG. 4 illustrates a known method for realizing such a curved grating. As shown in FIG. 4, a curved state of a grating 401 can be maintained by applying force 403 to supporting elements 402 (See, Japanese Patent Publication Laid-Open No. 2007-206075).

However, in the method shown in Japanese Patent Publication Laid-Open No. 2007-206075, it is necessary to continuously apply force to the grating for maintaining the curvature while the grating is irradiated with X-ray radiation. Otherwise, the grating cannot maintain the curvature and returns to a non-curved state, whereby the quality of image detection can be negatively affected. Thus, the known grating structure lacks shape stability.

SUMMARY OF THE INVENTION

The present invention provides a process of producing a grating to be used in an X-ray image pickup apparatus, wherein the grating has shape stability for maintaining a desired curvature of the grating without continuously applying force to the grating while the grating is irradiated with X-ray radiation.

An aspect of the present invention is a process of producing a grating to be used in an X-ray image pickup apparatus. The process includes the steps of preparing a grating having a plurality of protrusions periodically arranged, curving the grating in the direction in which the plurality of protrusions is arranged, and filling spaces between the protrusions with a metal in a state that the grating is curved.

Since the spaces (apertures) of the grating are filled with the metal, the grating is prevented from returning to the original shape even if force is not continuously applied to the grating for maintaining the curvature of the grating while it is irradiated with X-ray. Therefore, the grating can maintain a desired curvature. That is, a process of producing a grating having shape stability, which is used in an X-ray image pickup apparatus, can be provided.

Further features of the present invention will become apparent to those of ordinary skill in the art from the following description of exemplary embodiments with reference to the attached drawings.

DESCRIPTION OF THE EMBODIMENTS

The process of producing a grating to be used in an X-ray image pickup apparatus according to an embodiment of the present invention includes the following steps:

(1) Grating-Preparing Step

In this step, a grating having a plurality of protrusions that is periodically arranged is prepared.

(2) Curving Step

In this step, the grating prepared in the step (1) is curved in the direction in which the plurality of protrusions is arranged.

(3) Metal-Filling Step

In this step, the spaces between the protrusions of the grating are filled with a metal in the curved state obtained in the step (2). Examples of the filling method include plating, chemical vapor deposition (CVD), and sputtering. When the plating is employed for filling the spaces with a metal, the grating having the protrusions prepared in the step (1) can have a seed layer, under the protrusions, serving as a starting point of deposition growth. The spaces between the protrusions are filled with the metal by plating using the regions where the protrusions are not formed in the seed layer of the grating, namely, the exposing surface area of the seed layer, as the starting point.

Examples of the grating produced through the steps (1) to (3) include absorption gratings and phase gratings that are used in X-ray image pickup apparatuses utilizing Talbot interference. The absorption gratings and the phase gratings are each composed of protrusions of the grating and a metal deposited in spaces between the protrusions. In the absorption grating, it is necessary that the protrusions have a thickness that allows X-ray radiation to penetrate therethrough and that the spaces between the protrusions are filled with the metal so that the metal has a thickness for absorbing X-ray radiation not to allow the X-ray radiation to penetrate therethrough. Here, the thickness that allows X-ray radiation to penetrate therethrough is, for example, 100 µm or more and 500 µm or less when the energy of incident X-ray radiation is 17.7 keV and the protrusions are made of Si. Furthermore, the thickness that does not allow X-ray radiation to penetrate therethrough is, for example, 20 µm or more and 200 µm or less when the energy of incident X-ray radiation is 17.7 keV and the filling metal is gold. In the phase grating, it is preferable that the protrusions and the metal have thicknesses such that the difference between the phase of X-ray penetrated through the regions of the protrusions of the grating and the phase of X-ray penetrated through the regions between the protrusions filled with the metal is $\pi/2$ or $\pi$.

First Embodiment

Figure 1A:
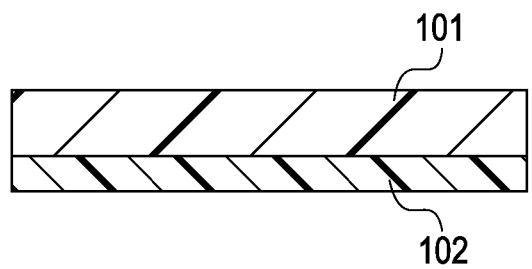
FIGS. 1A to 1I are diagrams illustrating steps of an exemplary process of producing a grating to be used in an X-ray image pickup apparatus according to a first Embodiment of the present invention.

An embodiment according to the present invention will be described with reference to FIGS. 1A to 1I.
(1) Grating-Preparing Step First, a seed layer 102 serving as a starting point of deposition growth is formed on one surface of a substrate 101 (FIG. 1A). Then, the substrate 101 is processed to form a grating pattern on the seed layer 102 for periodically arranging a plurality of protrusions and thereby to form a grating 106 having the seed layer 102 and protrusions 104.

The protrusions 104 are periodically arranged on the seed layer 102. In this specification, the term "periodically arranged" means that the protrusions are aligned at regular intervals, resulting in a repetition of patterns at fixed intervals of space. The width of each protrusion and the width of each space between the protrusions can be the same. By doing so, the width of the region allowing X-ray radiation to penetrate therethrough and the width of the region shielding X-ray radiation are the same. Consequently, a clearer image can be obtained when such arrangement is applied to an absorption grating. Furthermore, the material of the protrusions can be a semiconductor material preferably silicon (Si) or the like. The thickness of the protrusions can be, for example, 100 µm or more and 500 µm or less when the energy of incident X-ray is 17.7 keV and the protrusions are made of Si.

Examples of the plane pattern of the protrusions include line and space, checkerboard pattern, and dot patterns.

Figure 1B:
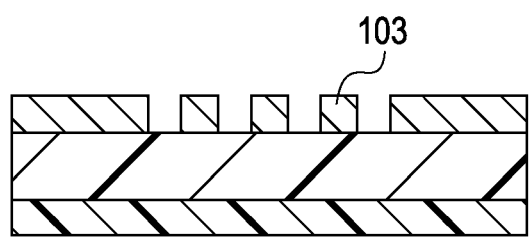
Figure 1C:
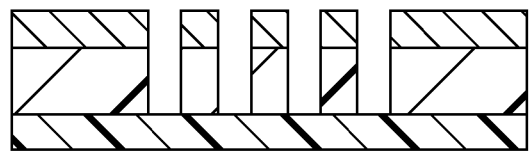
Figure 1D:
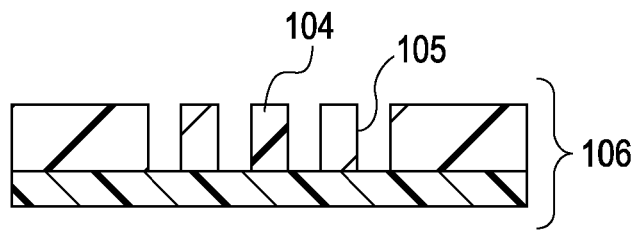

The grating pattern periodically arranging the protrusions 104 may be formed by any method without particular limitation, but it is preferable that the seed layer 102 formed on one surface of the substrate 101 is exposed. For example, the protrusions 104 can be formed by providing a mask layer 103 on the substrate 101, etching the substrate 101, and then removing the mask layer 103 (FIGS. 1B to 1D).

The etching may be performed by dry etching or wet etching. Examples of the dry etching include a Bosch process and a cryogenic process; and examples of the wet etching include anisotropic wet etching using potassium hydroxide (KOH). In this specification, the Bosch process is dry etching in which $SF_6$ and $C_4F_8$ are alternately introduced into plasma. The cryogenic process is dry etching that is conducted with a plasma mixture of $SF_6$ and $O_2$ at extremely low temperature (about $-100°$ C.). In the dry etching, the seed layer 102 also functions as an etching stopper layer. The etching method can be properly determined depending on the material of the substrate 101. Furthermore, the grating pattern may be formed by processing using a tool or by sandblasting, without conducting etching.

The material of the substrate 101 can be determined according to the application purpose, and examples thereof include Si and resin materials. In a case of producing the absorption grating, a structure having high X-ray transmissivity and a high aspect ratio can be easily produced. A substrate 101 of Si having a thickness of 100 µm or more and 500 µm or less can have an X-ray transmissivity of 80% or more when the energy of the incident X-ray is 17.7 keV. In addition, among the resin materials, a chemically amplified photoresist can have a high resolution and easily produce a structure with a high aspect ratio.

It is recommended that the seed layer 102 is made of a material that can be the starting point from which the plating grows in the metal-filling step described below. Examples of the material include Au, Cu, Cr, Al, Ti, Ni, Si, electrically conductive resins, and resins containing conductive materials. The seed layer 102 can be made of a material that has ductility and is easily curved in the curving step described below. When the seed layer 102 is made of Au or Al, the adhesion between the substrate 101 and the seed layer 102 can be increased by disposing a layer of, for example, Ti, Cr, or TiN between the substrate 101 and the seed layer 102. A seed layer 102 of Au having a thickness of 500 nm or more and 1.4 µm or less can have an X-ray transmissivity of 80% or more when the energy of the incident X-ray is 17.7 keV. As the method for forming the seed layer 102, vapor deposition and sputtering can form a layer having high adhesion and a uniform thickness.

The mask layer 103 can be properly determined according to the substrate 101 and the process of etching. For example, when the substrate 101 is made of Si, an organic layer such as a hardened film of a photosensitive resin or an inorganic layer made of a material such as $SiO_2$, SiN, Cr, or Al can be used as the mask layer 103. The mask layer 103 can be removed by, for example, dry etching, of which mechanical damage to the substrate is smaller than that of the wet etching when the substrate is made of Si.

In addition, the process can include the step of forming a reinforcement layer on the seed layer 102 on the side opposite to the surface on which the protrusions 104 are provided. By forming the reinforcement layer, cracks and deflections tend not to occur in the seed layer 102 when the grating 106 is curved in the curving step described below.

Figure 1E:
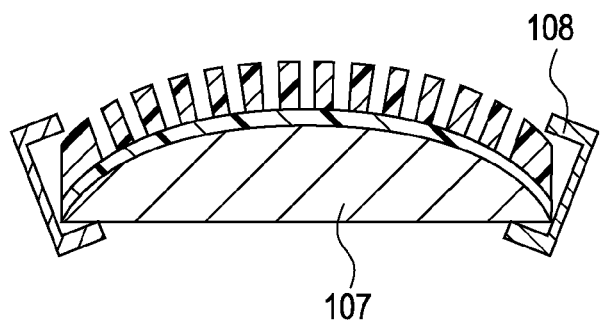

The reinforcement layer is not particularly limited and may be, for example, a resin layer or a metal layer, and a metal layer made of Cu, Al, or the like can be high in ductility and can be easily removed later. Furthermore, in order to increase the adhesion between the seed layer 102 and the reinforcement layer, an intermediate layer of Ti, Cr, or the like can be formed on the seed layer 102 after formation of the seed layer 102, and then the reinforcement layer can be formed on the intermediate layer.
(2) Curving Step Then, the produced grating 106 is curved in the direction in which the plurality of protrusions is arranged (FIG. 1E).

Figure 4:
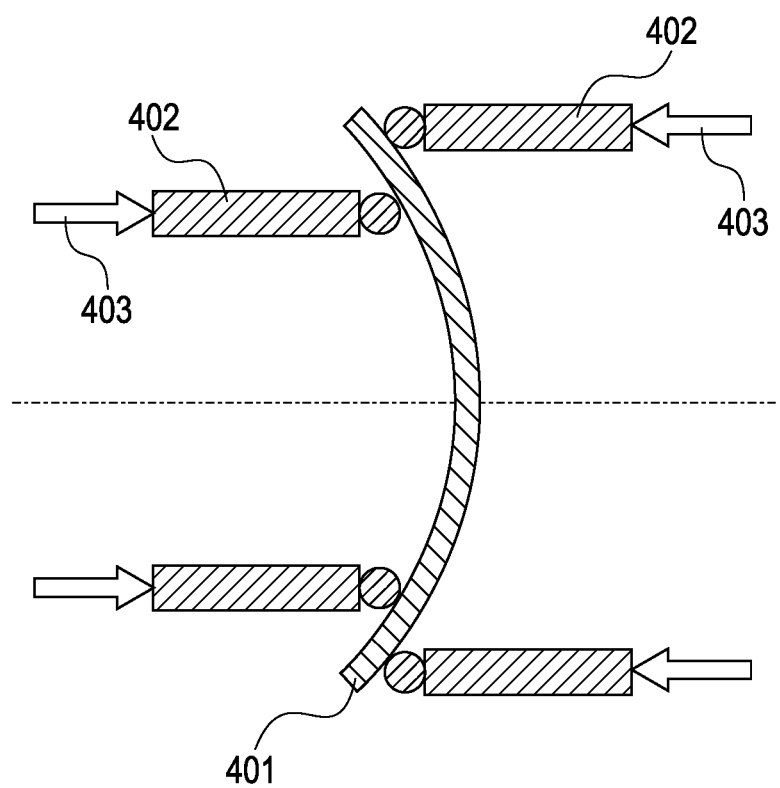
FIG. 4 is a diagram illustrating a curved grating shown in Japanese Patent Laid-Open No. 2007-206075.

The method for the curving is not particularly limited and may be a method pressing and fixing a mold to the grating or a method using a supporting element as shown in FIG. 4. Among such methods, the method pressing and fixing a mold for forming a curve to the grating can curve the grating at a desired curvature radius with higher accuracy and more evenly when the mold has a curvature radius according to an X-ray emission angle. Specifically, a mold 107 having a desired curvature radius is pressed to the seed layer 102 on the side opposite to the side of the protrusions to hold the grating until it conforms the a predetermined shape (FIG. 1E). As the method for the fixing, for example, as shown in FIG. 1E, the curved grating and the mold can be nipped and held by a holding mechanism 108. Alternatively, the mold may be bonded to the seed layer 102 with an adhesive applied to the surface of the mold.

Figure 1F:
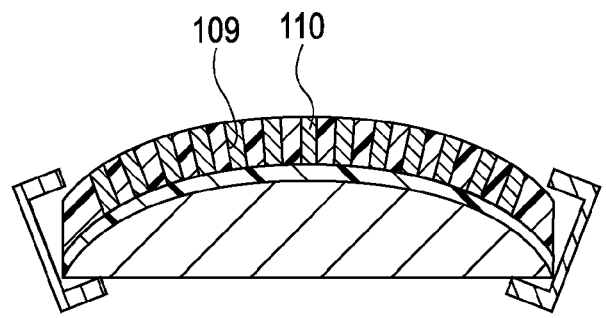

When the grating is curved, as shown in FIG. 1F, the grating may protrude (is curved) in the direction in which the protrusions 104 are formed. Alternatively, the grating may protrude (be curved) in the direction opposite to the direction in which the protrusions 104 are formed. When the grating protrudes in the direction in which the protrusions 104 are formed makes the aperture width of the space between the protrusions wide and allows the empty space between the protrusions to be easily filled with a metal. When the grating is curved in the direction opposite to the direction in which the protrusions 104 are formed, the width of the space between the protrusions will become narrower, which can reduce the amount of material required for filling.

In the present invention, the curvature radius is defined by the distance from an X-ray source to the grating. The curvature radius may be a value empirically calculated that can give a clear captured image. Accordingly, the curvature radius may be a value that allows X-ray to enter the grating 106 in parallel with the space between the protrusions of the grating 106. A curvature radius R for satisfying such conditions can satisfy the equation, $R=(d^2/\lambda)\times(1/2)\times m$, when a phase grating in which the phase difference between the phase of X-ray radiation penetrated through the protrusions and the phase of X-ray radiation penetrated through the aperture is $\pi/2$ is used in an X-ray image pickup apparatus using Talbot interferometry. In addition, when a phase grating in which the phase difference is $\pi$ is used, a curvature radius R can satisfy the equation, $R=(d^2/\lambda)\times(1/8)\times m$. In this specification, d denotes the pitch of the phase grating, $\lambda$ denotes the wavelength of X-ray radiation, and m denotes an odd number. Incidentally, the pitch of the phase grating denoted here designates the period of the arranged protrusions. This may be the distance between the central portions of a protrusion and its adjacent protrusion or may be the distance between the edge faces of a protrusion and its adjacent protrusion.

In FIG. 1E, the mold 107 is a tool for forming a curve according to the radiation angle of incident X-ray. Such a molding structure may be any mold or device that can impart on the grating 106 a curvature radius that substantially satisfies the above-mentioned equations. The mold 107 may be made of any material that can curve the grating 106 along the surface of the mold. When the plating liquid used in the metal-filling step described below is acid or alkaline, the material of the mold can be selected from synthetic quartz, glass, resins, and the like. However, when the metal-filling step described below is performed by electroplating, an insulative mold can prevent plating deposition to the mold. In addition, when the step of removing the mold 107 is not performed after the metal-filling step described below, the mold 107 can be made of a material having high transmissivity of X-ray radiation. Furthermore, the mold 107 can be made of a material that can be easily processed so as to have a desired curvature.

(3) Metal-Filling Step

The spaces between the protrusions are filled with a metal (110 of FIG. 1F) by plating using the regions (109 of FIG. 1F) where the protrusions are not formed in the seed layer 102 as the starting points. Since the spaces between the protrusions are filled with the metal, a desired curvature can be stably kept without necessity of a mechanism for maintaining the curved state.

Examples of the metal, that is, the plating material, include Au, Bi, Ni, Pb, Pt, Cr, Cu, Sn, Zn, Ag, and alloys of two or more of these metals. When the absorption grating is produced, the filling metal can be selected from materials having high X-ray absorption, such as Au, Bi, Ni, Pb, and Pt. Among them, Au and Ni have higher X-ray absorption compared to other metals, and Ni and Pb can be easier plated compared to other metals.

The plating can be performed by, for example, electroplating or non-electroplating, and the electroplating is high in growth rate of deposition and can easily deposit a metal on a target position.

In addition, when a metal layer is formed between the protrusions by sputtering before filling the apertures with a metal by plating, the filling metal is hardly exfoliated. Examples of the metal used in the sputtering include Cr and Ti.

In this specification, the term "filling with a metal" does not mean that the space between the protrusions is filled with the metal without gaps, and the thickness of the filling metal 110 can vary within the range that is necessary for absorbing X-ray. That is, the thickness may be in any degree as long as X-ray is absorbed without allowing penetration. Therefore, when the height of the protrusions 104 is large, the space between the protrusions may not be completely filled with the metal, and when the height of the protrusions 104 is small, inversely, the metal 110 may protrude from the space between the protrusions in some cases.

In the absorption grating, when the incident X-ray energy is 17.7 keV and the space between the protrusions are filled with gold so as to have a thickness of 20 μm or more and 200 μm or less, X-ray can be sufficiently absorbed. In the specification, the term "X-ray can be sufficiently absorbed" means that X-ray transmissivity is 20% or less when the energy of incident X-ray is 17.7 keV. In the phase grating, the space between the protrusions can be filled with a metal to a thickness that shifts the phase of X-ray by $\pi$ and thereby allows the X-ray to penetrate.

As described above, since the space between the protrusions are filled with the metal 110 in a state that the substrate 101 is curved, the grating 106 can hold a desired curvature, and the curvature can be maintained without using a holding mechanism for making a curve. Only by providing a pattern of the protrusions 104 on the seed layer 102, not only the pattern of the protrusions can be held, but also the space between the protrusions can be filled with a metal by plating using the seed layer 102 as the starting points.

Figure 1G:
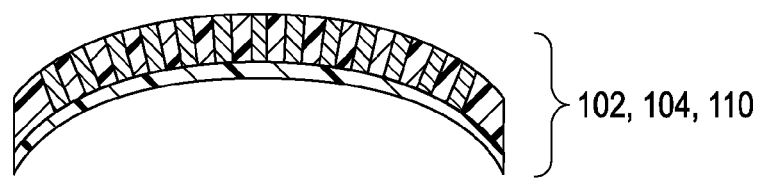

In addition, after the metal-filling step (3), the step of removing the mold 107 fixed to the seed layer 102 can be conducted (FIG. 1G). By removing the mold 107, absorption of X-ray by the mold 107 does not occur, and X-ray with high brightness can be obtained. In addition, it is unnecessary to select a material having high X-ray transmissivity as the material of the mold 107.

In the case that the reinforcement layer is provided, the step of removing the reinforcement layer can be conducted.

Figure 1H:
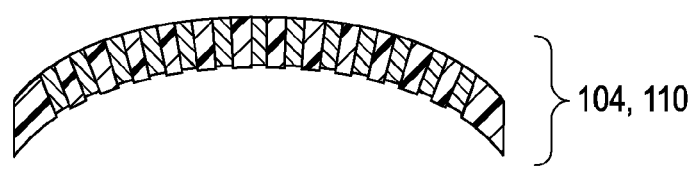

In addition, after the metal-filling step (3), the step of removing the seed layer 102 may be conducted (FIG. 1H). Specifically, when the seed layer 102 is made of Au, the seed layer 102 can be removed with aqua regia. X-ray absorption due to the seed layer does not occur by removing the seed layer 102.

Figure 1I:
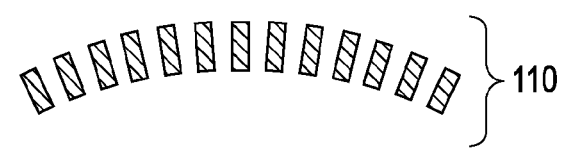

Furthermore, after the metal-filling step (3), the step of selectively removing the protrusions 104 only and of keeping the metal 110 may be conducted (FIG. 1I). By doing so, absorption of X-ray by the protrusions 104 does not occur. When the substrate 101 is made of Si, the Si can be selectively removed by dry etching using $XeF_2$ gas. When the substrate is made of Si and the space between the protrusions are filled with Au, the Si can be selectively removed by wet etching using a mixture of hydrofluoric acid and nitric acid.

Since the grating produced by the process of the present invention maintains the curvature by means of the metal, as shown in FIG. 1I, a grating made of only the metal material 110 can be produced by removing Si. By doing so, further higher brightness can be obtained.

Through the above-described steps, a curved grating can be produced. The production process according to the present invention can be carried out for producing an absorption grating to be used in an X-ray image pickup apparatus utilizing Talbot interference.

Second Embodiment

Another embodiment according to the present invention will be described with reference to FIGS. 2A to 2I.

(1) Grating-Preparing Step

Figure 2A:
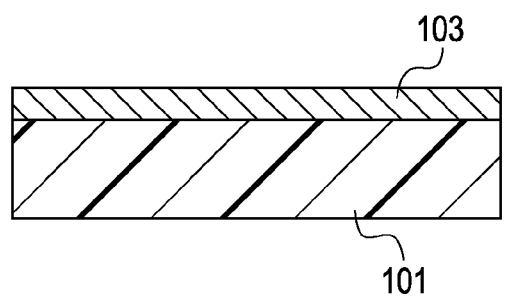
FIGS. 2A to 2I are diagrams illustrating steps of a further exemplary process of producing a grating to be used in an X-ray image pickup apparatus according to a second Embodiment of the present invention.

First, a hard mask layer 103 is formed on a surface of a substrate 101 (FIG. 2A). The material of the hard mask layer 103 can be properly selected according to the type of the substrate. For example, when the substrate 101 is made of Si, the material can be selected from materials functioning as a mask during etching of Si, for example, silicon oxide such as $SiO_2$, SiN, Cr, or Al.

Figure 2B:
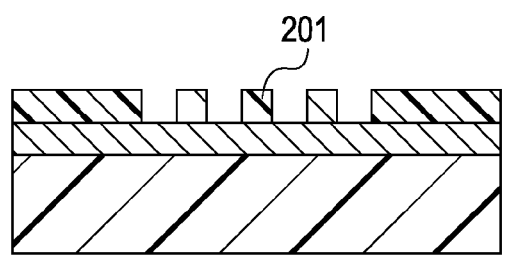
Figure 2C:
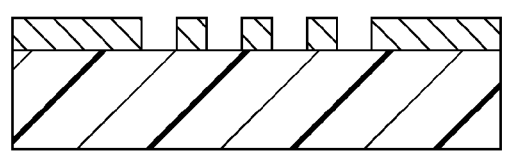

Then, a resist mask 201 having a predetermined pattern is formed on the surface of the hard mask layer 103 (FIG. 2B). Then, the hard mask layer 103 is etched using the resist mask 201 as a mask (FIG. 2C). After the etching, the resist mask 201 may be removed.

Figure 2D:
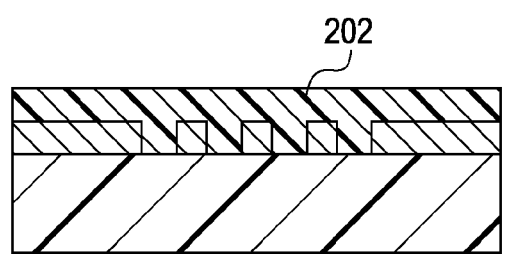

Then, a mask layer 202 is formed on the hard mask layer 103 thereby to protect the formed pattern (FIG. 2D). Here, the material of the mask layer 202 can be properly selected from, for example, a resist, Au, Cr, silicon oxide such as $SiO_2$, and SiN. In addition, the mask layer 202 may be combination of two or more layers of different materials selected from such materials. For example, a layer of a material other than resist is formed, and a protective layer of resist may be further formed.

Figure 2E:
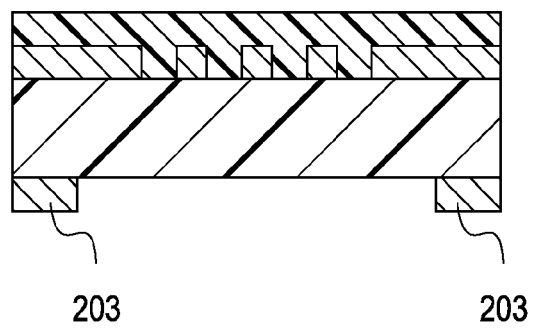

Furthermore, a mask layer 203 is further formed on the surface of the substrate 101 on the side where the mask layer 202 is not formed and in a region where the grating is not formed (FIG. 2E). The material of the mask layer 203 is properly selected from materials functioning as a mask during etching of Si, such as $SiO_2$, SiN, Cr, or Al.

Figure 2F:
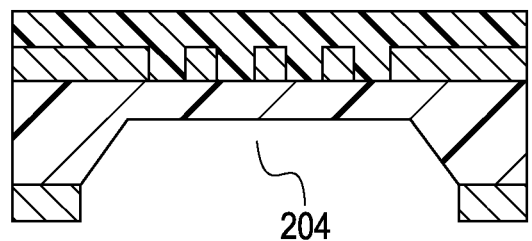

The substrate 101 is etched using the mask layer 203 as a mask to form an aperture 204 (FIG. 2F). Examples of the etching method include anisotropic wet etching using KOH and dry etching by a Bosch process or a cryogenic process.

Figure 2G:
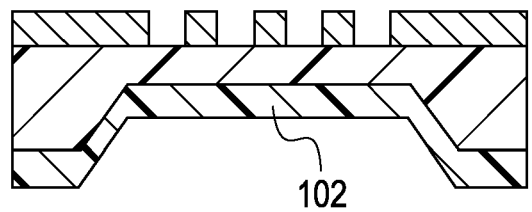

A seed layer 102 serving as a seed layer for plating is formed on the substrate 101 on the side having the aperture 204 (FIG. 2G). The material of the seed layer 102 can be the same material as that in the first Embodiment. In addition, the mask layer 203 on the side for forming the seed layer 102 is removed at least before formation of the seed layer 102, and the mask layer 202 is removed at least before formation of a grating pattern 104, which will now be described.

Figure 2H:
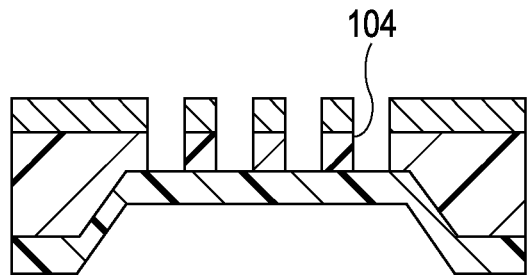
Figure 2I:
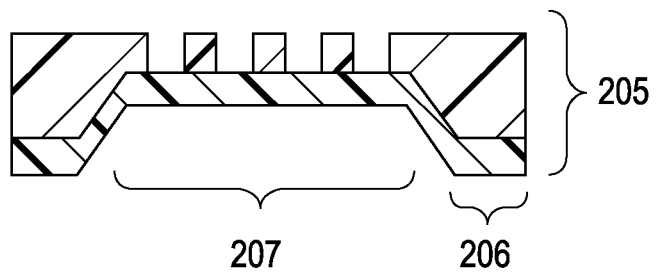
Figure 3:
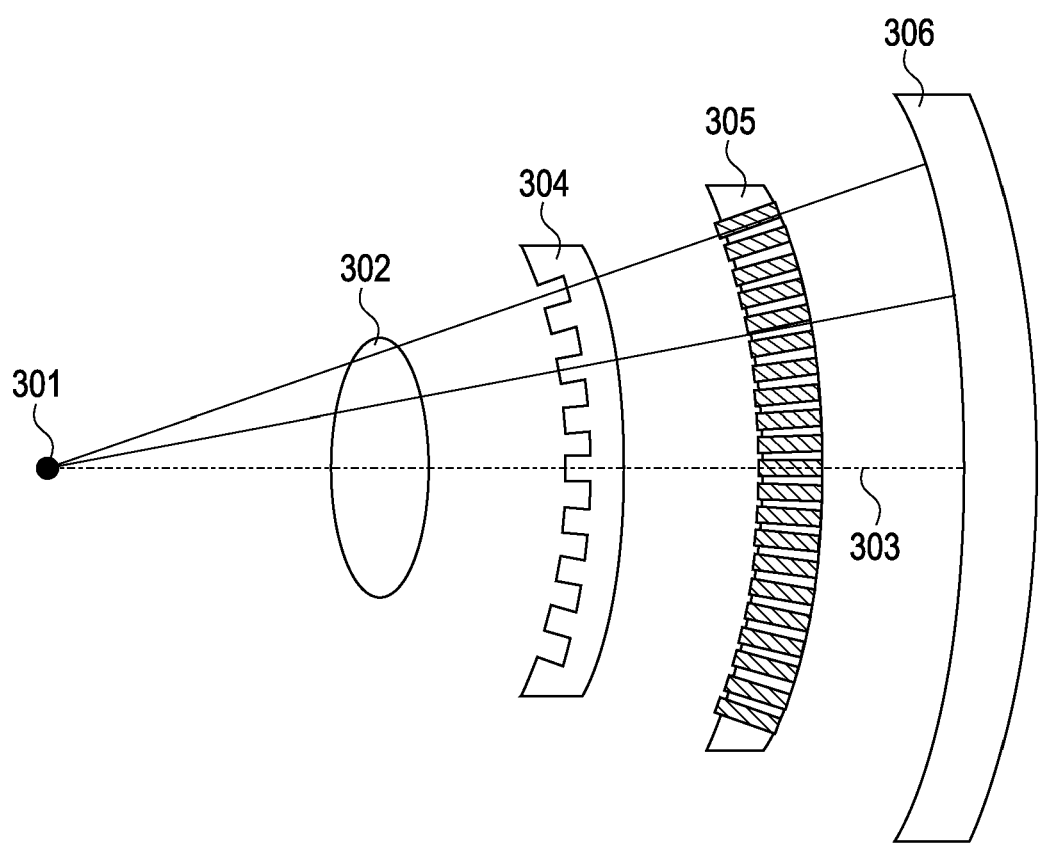
FIG. 3 is a diagram illustrating an exemplary image pickup apparatus utilizing Talbot interference.

The grating pattern 104 is formed in the substrate 101 using the hard mask layer 103 as a mask (FIG. 2H). Then, the hard mask layer 103 is removed (FIG. 2I). The grating can be formed by the same method as that in the first Embodiment. The step shown in FIG. 1E and the subsequent steps are carried out using the thus produced grating 205.

In the grating 205 produced by the second Embodiment, as shown in FIG. 2I, since the thickness of the substrate in the region 207 in which the grating pattern is formed is smaller than that of the grating 106 produced in the first Embodiment, a larger amount of X-ray can penetrate therethrough. In addition, since the thickness in the region 206 where the grating pattern is not formed is the same as that of the initial thickness of the substrate, the risk of breakage or the like during the production of the grating can be decreased.

In the process of producing the grating to be used in an X-ray image pickup apparatus according to the second Embodiment, if the aperture 207 shown in FIG. 2I has a region having the same curvature as that of a mold that is pressed to the aperture 207, the mold can be easily pressed.

(2) Curving Step

The same step as in the first Embodiment can be carried out.

(3) Metal-Filling Step

The same step as in the first Embodiment can be carried out.

In addition, the process may include steps other than the steps (1), (2), and (3) described in the first Embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-200237 filed Aug. 31, 2009, which is hereby incorporated by reference herein in its entirety.

What is claimed is:

1. A process of producing a grating to be used in an X-ray image pickup apparatus, comprising the steps of:
    preparing a grating having a plurality of protrusions periodically arranged; and
    filling spaces between the protrusions with a metal,
    wherein the step of preparing the grating includes:
    forming a seed layer on one surface of a Si substrate, and
    forming the plurality of protrusions on the seed layer by etching the Si substrate to expose the seed layer.

2. The process according to claim 1, further comprising the step of:
    forming a layer made of at least one of Ti, Cr, and TiN between the seed layer and the protrusions.

3. The process according to claim 1, wherein the spaces between the protrusions are filled with at least one of Au, Bi, Ni, Pb, Pt, or an alloy of two or more thereof.

4. The process according to claim 1, further comprising the step of:
    forming a reinforcement layer on the seed layer on the side opposite to the surface on which the protrusions are provided.

5. A process of producing a grating to be used in an X-ray image pickup apparatus utilizing Talbot interference, wherein the grating is an absorption grating or a phase grating and is produced according to claim 1.

6. The process according to claim 1, wherein the step of preparing the grating includes the step of:
    forming an aperture on a second surface which is an opposite surface to the surface on which the protrusions are provided.

7. The process according to claim 1, wherein
the protrusions are made of Si,
a thickness of the protrusions is 100 µm or more and 500 µm or less,
the metal is Au, and
a thickness of the metal is 20 µm or more and 200 µm or less.

8. The process according to claim 1, wherein filling the spaces between the protrusions with a metal includes a process of electroplating the metal into the spaces or a process of liquid plating the metal into the spaces.

9. The process according to claim 1, further comprising the steps of:
curving the grating to a state in which the grating is curved in the direction in which the plurality of protrusions is arranged,
wherein the step of filling spaces between the protrusions with a metal is performed in the state that the grating is curved.

10. The process according to claim 9, wherein the step of curving is performed by pressing a mold against the seed layer on the side opposite to the surface on which the protrusions are provided.

11. The process according to claim 10, further comprising a removing step, wherein the mold pressed against the seed layer is removed after the step of filling spaces between the protrusions with the metal.

12. The process according to claim 9, wherein the step of preparing the grating further includes the step of:
forming a reinforcement layer on the seed layer on the side opposite to the surface on which the protrusions are provided, wherein the reinforcement layer is a resin layer or a metal layer, and
the step of curving is performed by pressing a mold against the reinforcement layer on the side opposite to the surface on which the seed layer is provided.

13. A process of producing a grating to be used in an X-ray image pickup apparatus utilizing Talbot interference, wherein the grating is an absorption grating or a phase grating and is produced according to the process of claim 9.

14. The process according to claim 9, wherein
the protrusions are made of Si,
a thickness of the protrusions is 100 µm or more and 500 µm or less,
the metal is Au, and
a thickness of the metal is 20 µm or more and 200 µm or less.

15. The process according to claim 9, wherein the step of curving the grating includes pressing a mold to the grating,
wherein the mold has a predetermined curvature radius according to an X-ray emission angle.

16. The process according to claim 15, wherein the mold is pressed to a side of the grating opposite to a side where the plurality of protrusions are arranged, and
wherein curving the grating includes pressing the mold to the grating until the grating conforms to the predetermined curvature radius.

17. The process according to claim 15, wherein, when the predetermined curvature radius is defined by R, the predetermined curvature radius satisfies one of the following conditions $$R=(d^2/\lambda)\times(1/2)\times m$$

$$R=(d^2/\lambda)\times(1/8)\times m$$

where d denotes a pitch of the protrusions in the grating, $\lambda$ denotes a wavelength of X-ray radiation incident on the grating, and m denotes an odd number.

* * * * *